INVENTOR.
FRANK D. GROSS
BY William D. Carothers
HIS ATTORNEY

2,981,176
Patented Apr. 25, 1961

2,981,176

PRODUCTION MACHINE CONTROL CIRCUITS

Frank D. Gross, Pine Township, Allegheny County, Pa., assignor to The Pannier Corporation, Pittsburgh, Pa., a corporation of Pennsylvania Filed Oct. 22, 1959, Ser. No. 848,067

12 Claims. (Cl. 101—18)

This invention relates generally to control circuits and more particularly to manual and automatic control circuits for setting up production machines.

In different phases of production in industry it is necessary to have control circuits, both manual and automatic, for pre-setting a production machine. This production machine may be in the form of a marker or stamper that not only consecutively numbers the items in production but also impresses thereon a history of the article. The item being stamped may be in the form of hot billets or ingots wherein the history would be the chemical analysis of the steel in the form of open hearth number, year class, open hearth heat number and billet number. It may also include trademarks and other detailed information relating to any one of the foregoing, such as the analysis of the steel.

In another field the control circuit comprising this invention may be employed to pre-set or pre-gauge production machinery before controlling pre-selected structural plate or beam members or contouring or shaping the same or other similar production steps in the industry.

Control circuits of the character comprising this invention may also be used in the packaging industry wherein final containers are provided with a series of items which are loaded into the final container from different sources and thus print thereon information dealing with each of the items or the combination.

Circuits of this character may also have extensive use in chemically metering materials in plants for the weighing and distributing from a series of bins or other sources of supplies and materials which are frequently changed in batches in the process of manufacturing chemical products.

The control circuits of the character comprising this invention are particularly advantageous for operating machinery in production wherein it is dangerous to have personnel at the locale of the operation of the machine, such as in marking hot steel and measuring out dusty poisonous materials in the drilling and shaping of steel in fast production line and other similar situations.

Another object is the provision of a control circuit wherein the accuracy is dependent upon the pre-fixing in a memory device of the indicia or data which is ultimately to be set up in the production machine, thereby materially reducing human error in production operations.

To illustrate the principles of this invention the control circuits are designed to energize fluid actuated devices for operating a series of character wheels each of which is provided with indicia employed to impress on the hot steel billets the year, the date, open hearth number, year class, open hearth heat number and billet number, which would involve a total of eight character wheels, which when functioning in pairs would be capable of impressing numbers 0 to 99 or when in combination of triplicates would be from 0 to 999, or in a series of similar combinations parts or the whole of an alphabet. With indicia of this character it is necessary to energize an electromagnetic circuit which in turn functions to actuate control valves for operating the fluid actuated devices to change the position of the character wheels. This operation is either manually by pushbutton or some form of memory device or an automatic teletype decoder which operates from a punch card system or a tape or other suitable registration that functions as a memory device. Thus when the order for specific character of steel is initiated, its metallurgical contents as well as heat treating program and other factual steps carrying it from its inception to completion in the mill will be be automatically recorded and this data is then presented to the card, tape or other memory device for impression on the billets or the steel as it leaves the mill. Thus all the information initially accumulated for the order is finally impressed on the steel as it leaves the plant in the form of a stamp in the metal itself without being controlled manually except upon the initial making up of the order which when made with specific requirements automatically sets up the indicia in the memory device that the billet or the steel is to have as it leaves the mill.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
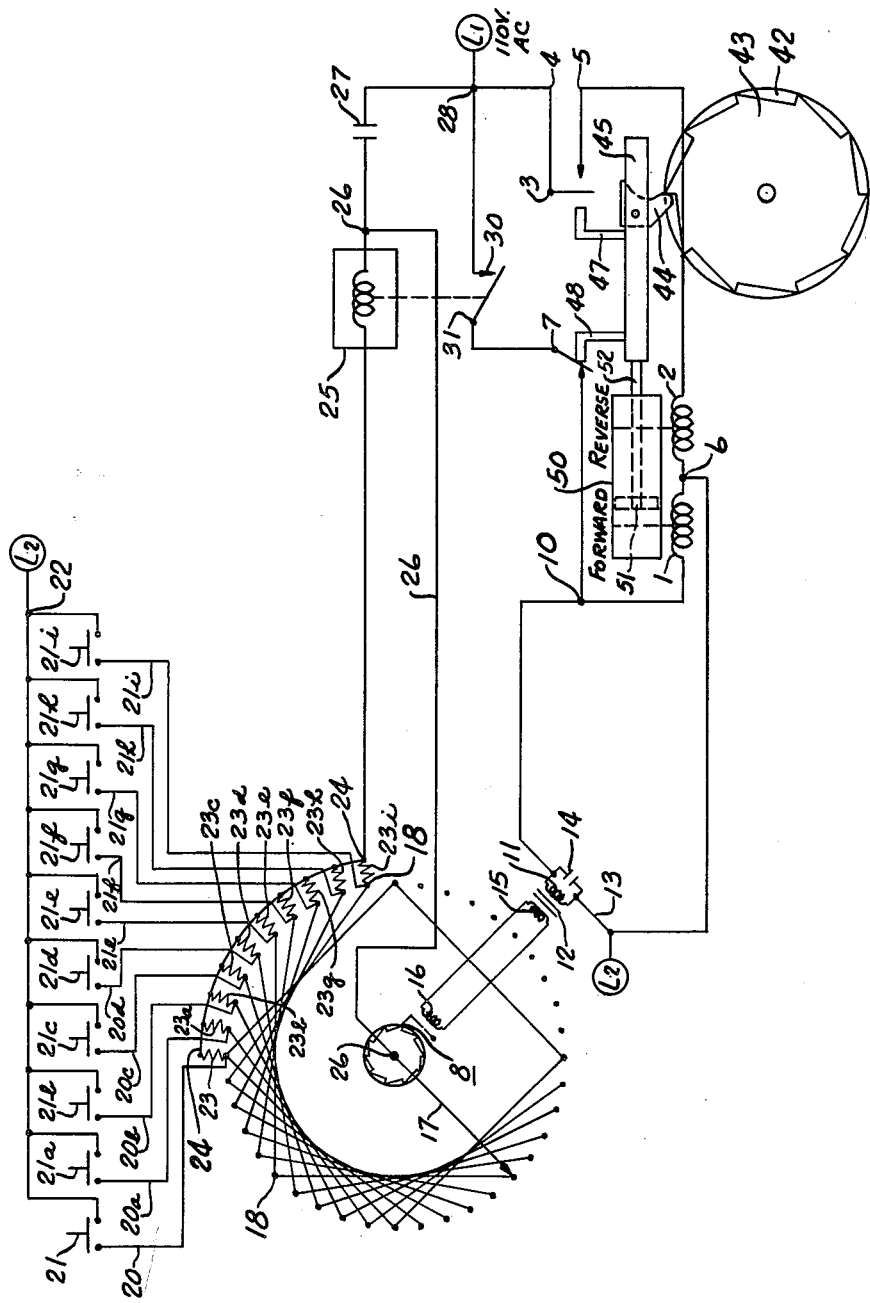
Fig. 1 is a schematic showing of a manual control circuit comprising this invention.

Referring to Fig. 1 of the drawings the control circuit is supplied as indicated at L1 and L2 in this instance with an ordinary service line of one hundred and fifteen volts, sixty cycle circuit, and the device to be controlled is shown in the form of two electromagnetic operating coils, 1 being indicated as the forward and 2 being indicated as the reverse. These electromagnetic operating coils will function to actuate in this instance air valves which reciprocate a pneumatic piston to full alternate limits of its stroke for the purpose of engaging a character wheel through a pawl for the purpose of ratcheting the same to a pre-selected position in accordance with the number of impulses through which the pneumatic piston is actuated. A pneumatic marker of this character is illustrated in the co-pending application entitled Remotely Operated Metal Stamping and Marking Machine, Serial No. 785,968, filed January 9, 1959.

As previously stated, the particular servo motor for actuating the character wheels of this device happened to be pneumatic. However electromagnetic servo motors 1 and 2 of this invention could of course function to operate hydraulically or electrically actuated structures for producing a similar operation, the pneumatic actuator electromagnetically controlled being merely an exemplified showing of this invention.

In the operation of the aforementioned pneumatically actuated marker a pair of limit switches are positioned at either end of the piston stroke, which limit switches are provided with contacts indicated at 3 and 7. The switch 3 is actuated when the piston is extended in the position just following the movement of the index or character wheel, one station or one position after which it closes the switch indicated at 3. This switch functions to supply current from L1 through connection 4, switch 3, connection 5, to the electromagnetic reversing winding 2, thence to the connection 6 and L2 on the opposite side of the source of electric current supply.

Upon the energization of winding 2 a valve is actuated to supply air or fluid on the piston to retract it from its forward position to its retracted position which is ordinarily referred to as its return position. When the piston initially leaves its forward position switch 3 is opened and remains open. However the valve actuated through this circuit also remains open and the fluid pressure is retained on this piston in its retracted position.

When the piston reaches its fully retracted position it closes the switch 7, which is a limit switch similar to that of 3, and when closed will function to complete a circuit for the purpose of de-energizing the piston to move again to its forward or extended position and as it moves again to the extended position limit switch 7 becomes open and its passage to its fully extended position or character wheel is again indexed and when fully extended switch 3 is again closed. Upon the energization of either of the electromagnetic devices 1 or 2 the operation of the valve also discharges the pressure from the opposite side of the piston so that the latter is free to actuate from one position to the other.

The forward actuating electromagnetic device 1 thus initiates the actual sequence of events in changing the character wheel one position. Thus the same circuit must also function to initiate the energization of the stepper contactor indicated at 8. This is accomplished by the energization of the line connection 10 from the limit switch contact 7 for the purpose of not only energizing the electromagnetic device 1 but also the primary 11 of the transformer 12 and thence through the line 13 to L2 on the opposite side of the current supply. A condenser 14 is placed in multiple with the primary as indicated.

The secondary 15 has both of its terminals connected to the opposite terminals of the actuating winding 16 of the stepper contactor 8 and each time that this actuating coil 16 is energized in the stepper 8 the contactor 17 of the stepper moves to its next consecutive position as indicated by the series of terminals 18 wherein each terminal, of which there may be many, around the perimeter of the stepper contactor as it travels through 360° on intermittent operation of each step so as to continuously rotate by steps serves to supply energy through a series of parallel circuits indicated by the line 20, one side of which is connected to the push button 21 and the opposite side of the push button 21 being connected to the line 22 and thence to L2.

The second of the multiple series of circuits is indicated by the line 20a which in turn would be connected to the push button 21a, the other side of which would be connected to the line 22 and then to the opposite side of the source of supply. The lines 20 and 20a may be represented in parallel circuits up to the number of characters on each of the character wheels, which represents the number of positions for each stamping member in the series. Each of the lines 20, 20a, etc. is also connected to its respective resistances 23 and 23a, the opposite side of which is connected by the line 24 to one side of the actuating coil of the start relay 25, the opposite side of which is connected by the line 26 through the condenser or resistance 27 to the line 28 and thence to L1. Line 26 is also connected to the sweep contacting member 17. Thus when any one or a series of the push buttons 21, 21a, etc. is depressed such push button will remain depressed until the sweep hand 17 of the contactor engages the circuit in which the push button is in for the purpose of shunting out the start relay 25. Thus each of the push buttons 21, 21a, etc. must be of the character that when depressed they will stay depressed mechanically until the next push button of the series is depressed at which time the first push button is released mechanically and the second push button remains depressed until it is cleared.

When any one of the series of push buttons 21 or 21a etc. is depressed current is supplied from the line L1 to line 28, the condenser 27, line 26, the actuating coil of the relay 25 and thence through line 24 to the selected relay 23, 23a, etc. and thence to line 20 or any of the multiple circuits 20a, etc., the push button 21 or any selected push button 21a, etc. to line 22 and thence to L2. Thus the start relay 25 will be energized by the push button depressed and this relay will remain energized until the sweep contactor 17 of the stepper contactor reaches the contact 18 of the control circuit energized at which time the start relay 25 will be deenergized.

When the relay 25 is energized it will close its front contact 30 by raising the heel 31 so as to connect line 28 with the contact 7 to the supply current 10 and thence to energize the forward actuated coil 1 as well as the stepper relay. Thus the operation of the piston itself through the reversing contact 3 and the forward contact 7 supplies alternate impulses both through the forward control electromagnetic member 1 and the stepper contactor 8 until the sweep contactor 17 shunts out the operation of the start relay 25.

As previously explained the circuit shown is a simplified form of the circuit for operating only one character wheel and the number of contacts 18 together with the particular circuit that it supplies must of course correspond with the number of characters on the character wheel. If there are eight character wheels in a stamping head and each character wheel has ten positions then this circuit together with the stepper contactor circuit must be duplicated eight times, each circuit being capable of serving each of the ten characters on each wheel.

Figure 2:
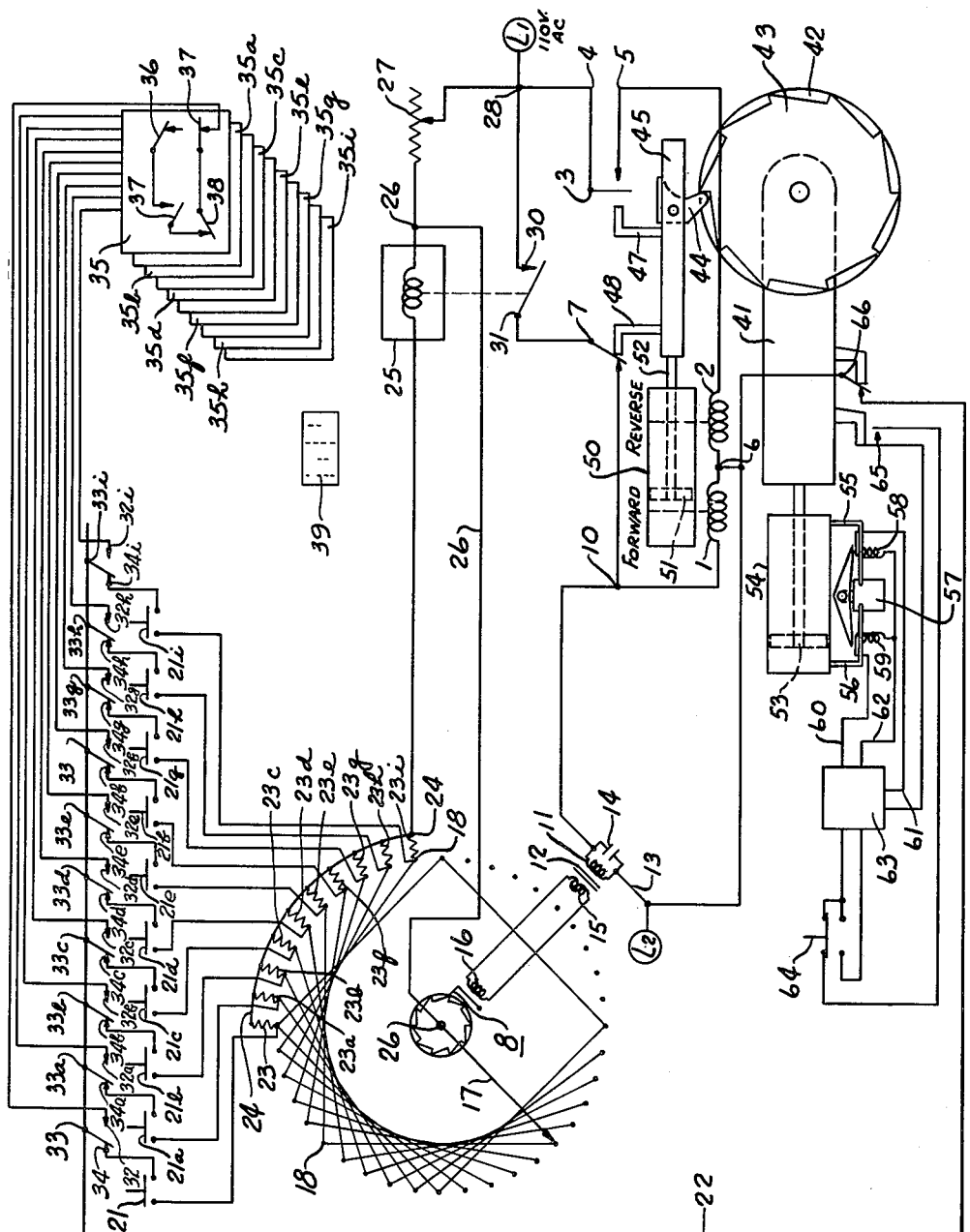
Fig. 2 is a schematic showing of an automatic control circuit comprising this invention.

Referring now to Fig. 2 which shows the automatic control circuit for actuating the forward and reverse electromagetic coils 1 and 2 for initiating the forward and reverse movement of the pneumatically energized piston, the circuit is substantially the same in so far as the stepper contactor and the valves together with the start relay. However in addition to these parts the automatic circuit is provided with the same type of step contactor and the contacts 18 are connected by their respective lines 20 and 20a to their respective push buttons 21 and 21a in the same manner as that previously described in conjunction with the structure of Fig. 1. To make each of these circuits automatic a Teletype decoder box is supplied for each push button and is arranged to have a predetermined circuit therein connected to each of the contacts 18 and the output of each Teletype decoder is connected to one contact 32 of a manual selector switch 33, the other contact 34 of which would be connected directly to the other side of the push button 21. Thus depending upon the position of the manual selector switch the circuit is energized either manually by the push button or automatically by the Teletype decoder indicated by the box 35 which displays, for example, a series of three switches, two of which close the circuit through their front contacts and a third through their back contact. These switches indicated at 36, 37 and 38 are merely demonstrative of a type of circuit that could be employed in the Teletype decoder box 35.

A character wheel having ten positions, there being eight character wheels in all, would of course require one Teletype decoder box 35 for each character position, being ten positions in all for each wheel. Each of these decoder boxes 35 will contain five relays and each of the five relays will have a combination of six front and six back contacts. Such relays are generally known as the telephone type relay and depending upon the energization of their combination determine the time that they will close the circuit from their respective contact 18 of the stepper relay when the manual selector switch 33 is connected to the contact 32. The reason for each Teletype decoder box 35 containing five relays is for the purpose of receiving five different impulses simultaneously from a Teletype read out machine which is represented by a card 39 or tape ordinarily of paper or of plastic material that has five perforations in one line and every time each perforation appears in that line the corresponding relay of each box 35 is energized and locks up by its own stick contact until the circuit has completed its function. A clearing impulse is supplied by the tape for dropping out each of these relays.

Thus the memory is obtained by first punching the combination of perforations in the tape corresponding to the desired combinations of indicia that is to appear in the consecutive sequence on the marker or other device and this tape is then in readiness to be fed through the Teletype read out which feeds the decoder 35 for properly arranging the marking head or other device represented thereby to complete the function at the proper time.

In the particular structure employed to demonstrate this invention the character wheels are required to revolve 360° or nine positions if need be in changing from one number to another or any less number.

The manual selector switch 33 is provided with a mechanical knob member 40 which will of course shift the switch in every position of the bank of Teletype decoder boxes 35. The knob 40 controls each of the switches 33 to connect the circuit to the manually operated position as by the push buttons or by the automatic system such as the decoder Teletype members 35 to 35i, as shown in Fig. 2. Also the pneumatic marker is shown with the hammer 41 carrying the marking head 42 with one marking wheel being shown, and its cam 43 actuated by the pawl 44 pivoted on the slide 45 and which also carries the actuators 47 and 48 for the limit switches 3 and 7. The slide actuators are controlled by the electromagnetically actuated coils 1 and 2 which in fact control air passing to opposite ends of the cylinder 50 to actuate the piston 51 either forward or reverse. The piston 51 is connected by the rod 52 to the slide 45 to actuate the pawl and turn the ratchet at each impulse. The marking head of the hammer 41 is connected to the piston 53 in the cylinder 54 fed by the fluid lines 55, 56 from the electromagnetically actuated valve 57 through the coils 58 and 59 connected by the lines 60 and 61 with the return line 62 to the reversing starter 63. This starter is controlled by the push button 64 with a check line through the limit contact 65 on the hammer 41. The hammer 41 also carries the limit contact 66 which breaks the line 22 to L2 when the hammer is forward or out of the position where the character wheels 42 may be changed either automatically at 35 or manually at 21.

I claim:

1. A control circuit for a changer in a marking machine having a marking wheel comprising a step contactor means having an operating coil and a circular series of independent contacts with a sweep contacting member, a resistance connected to each contact, an independent initiator means connected to each contact for providing an impulse from one side of a line source of supply to said contact which retains its impulse giving position until its contact has been engaged by said sweep contacting member, an impulse operated marker actuating means to step the marker wheel through its series of positions, a relay having one end of its operating coil connected to the other end of all of said resistances and the other end connected to the other side of the line source of supply, a contact actuated by said relay to be closed when said relay is energized to close a circuit and energize said stepper operating coil and said marker actuating means, said sweep contacting member engaging each contact in turn and connected to said other end of said relay operating coil to shunt out the same and release said relay when said sweep contacting member engages the contact energized by said initiator means.

2. The control circuit of claim 1 characterized in that the circuit energized by said relay contact also includes a limit switch on said marking wheel changer.

3. The control circuit of claim 1 which also includes a limit switch closed by said marker actuating means when in its extended position for closing a circuit to return the same.

4. The control circuit of claim 1 which also includes impedance means in the line circuit between said relay operating coil and said other side of said line source of supply.

5. The control circuit of claim 1 characterized in that said step contactor has repeated series of contacts connected together.

6. The control circuit of claim 1 characterized in that said initiator means are push buttons that remain closed until the next push button is depressed after said sweep contacting member removes the impulse carried thereby.

7. The control contactor of claim 1 characterized in that the circuit from said initiator means to said one line side also includes a contact closed by the return of said marker actuating means.

8. The control circuit of claim 1 characterized in that said initiator means includes a memory device impulse means for containing pre-delivered impulses.

9. The control circuit of claim 1 characterized in that said initiator means includes a push button that remains closed until the next push button is depressed after said sweep contacting member removes the impulse carried thereby, and an automatic memory device impulse means, and a selector switch to selectively connect said push button or said automatic memory device impulse means in said circuit with each contact of said circular series of contacts.

10. The contact circuit of claim 9 which also includes a record means to supply information to said automatic memory device.

11. The control circuit of claim 1 characterized in that said initiator means are push buttons which when depressed energize said relay, said relay remaining energized until sweep contacting member removes the impulse carried thereby.

12. The control circuit of claim 1 characterized in that said initiator means includes a push button which when depressed energizes said relay, and an automatic memory impulse means, and a selector switch to selectively connect said push button and said automatic device memory means in said circuit with each contact of said circular series of contacts.

No references cited.